Figure 6:
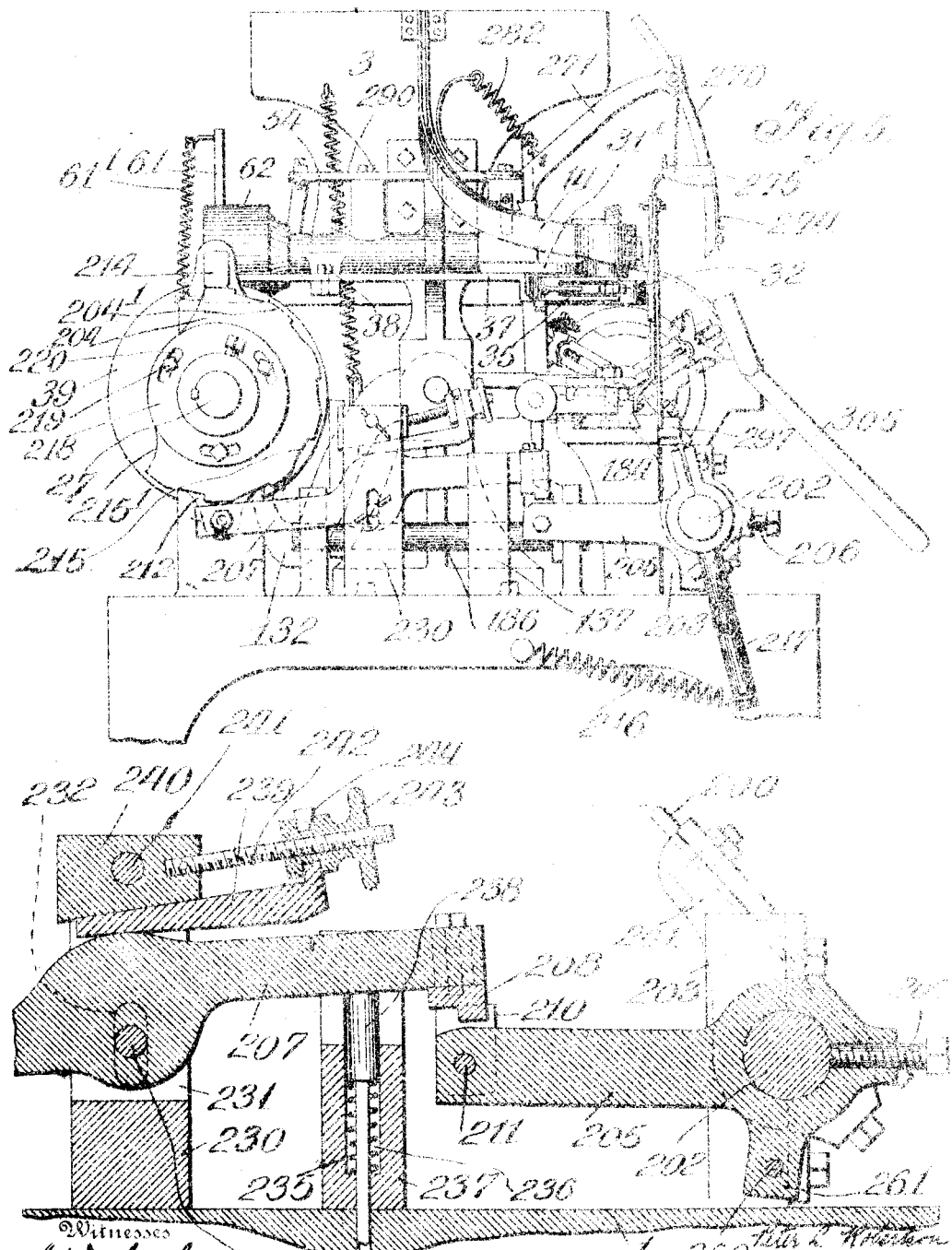

P. L. ROBERTSON.
SCREW MACHINE.
APPLICATION FILED DEC. 27, 1910.
1,051,915.
Patented Feb. 4, 1913.
12 SHEETS—SHEET 1.
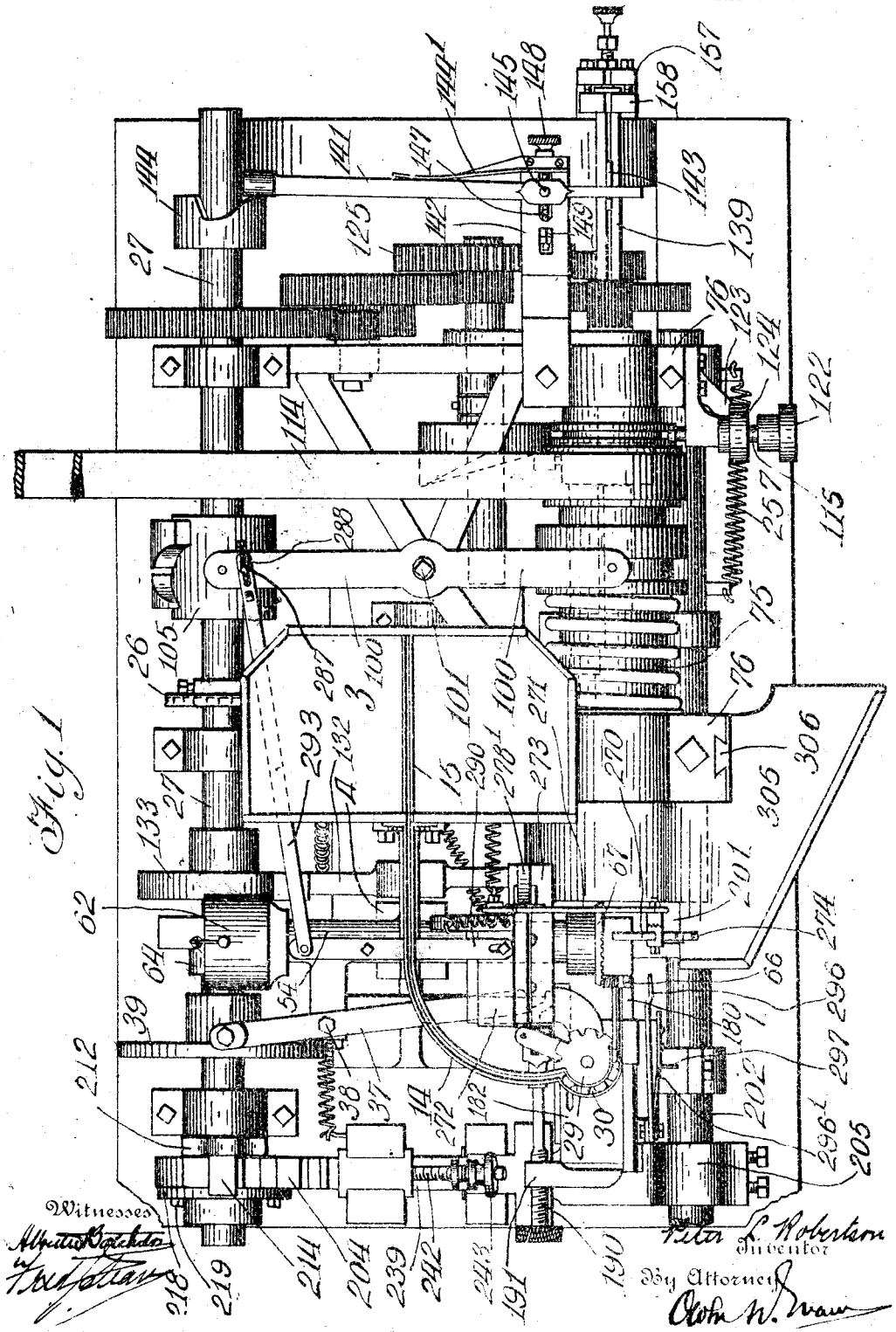

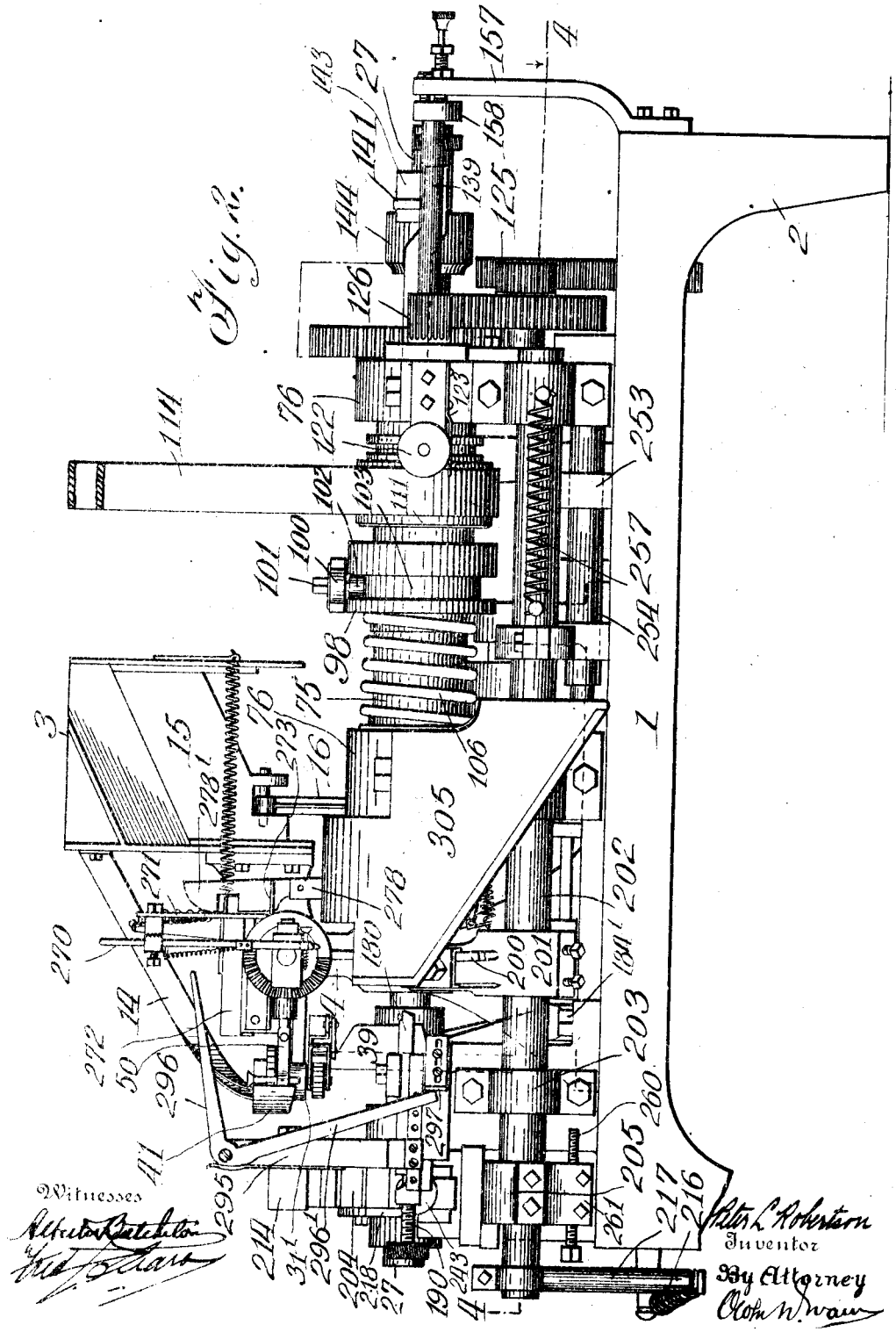

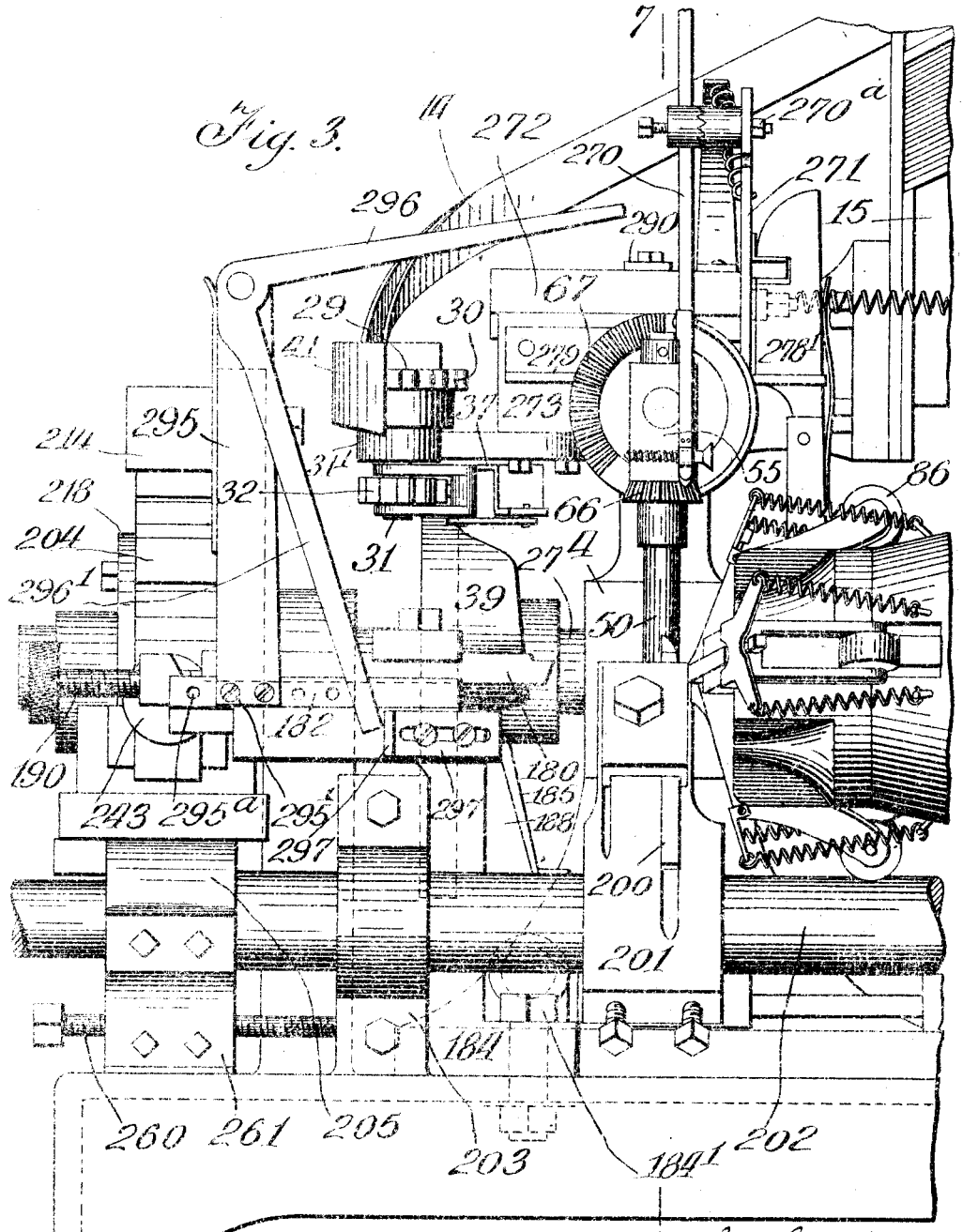

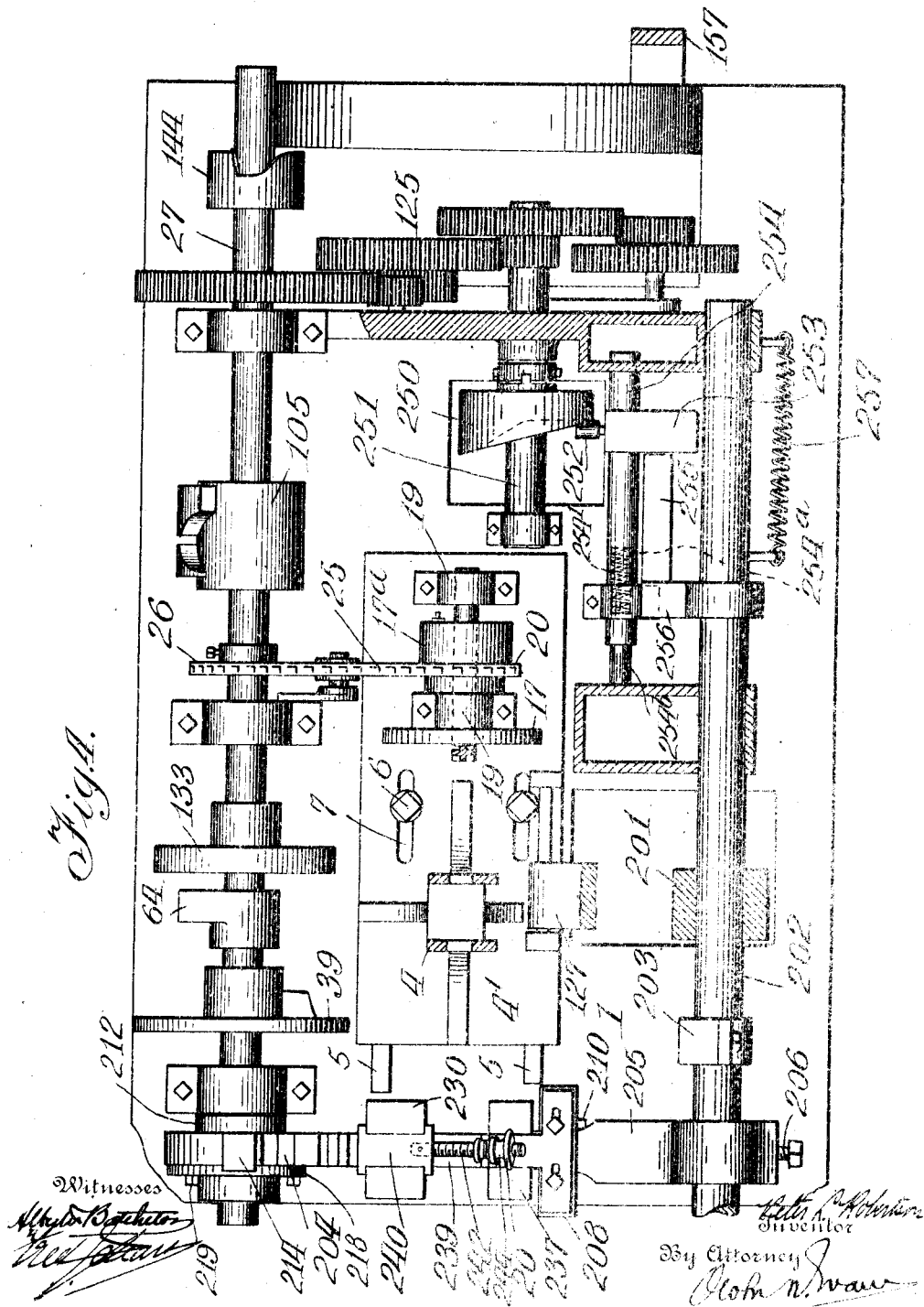

P. L. ROBERTSON.
SCREW MACHINE.
APPLICATION FILED DEC. 27, 1912.

1,051,915.

Patented Feb. 4, 1913.

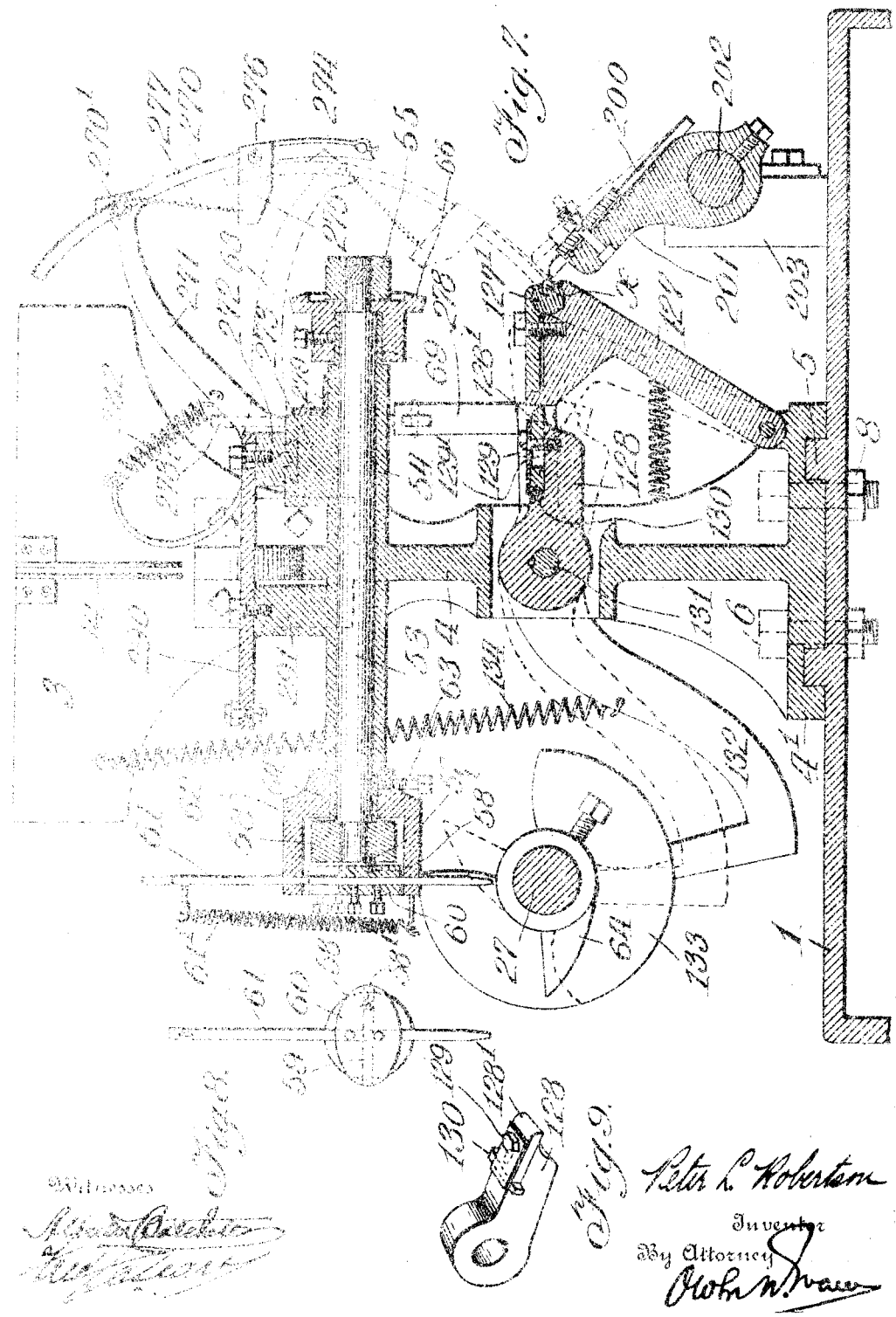

P. L. ROBERTSON.
SCREW MACHINE.
APPLICATION FILED DEC. 27, 1910.
Patented Feb. 4, 1913.
12 SHEETS—SHEET 7.
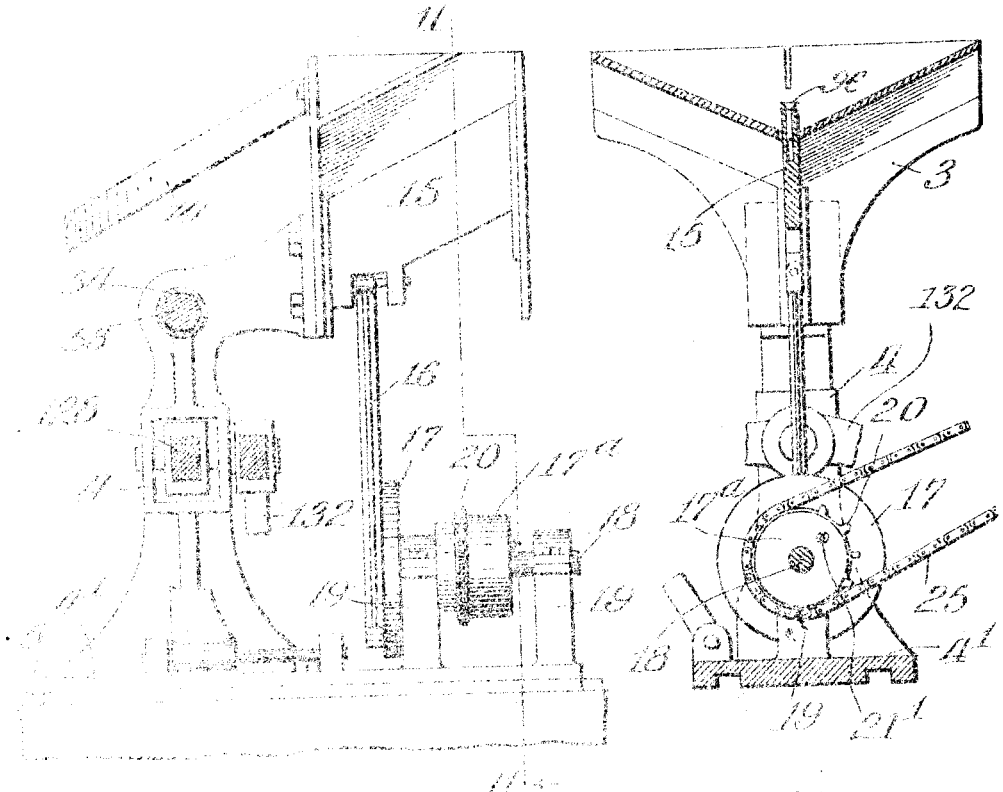
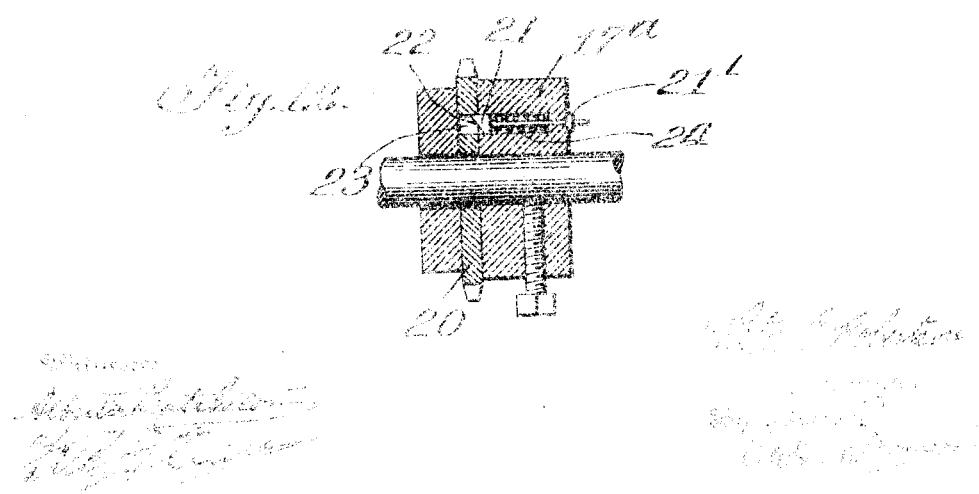

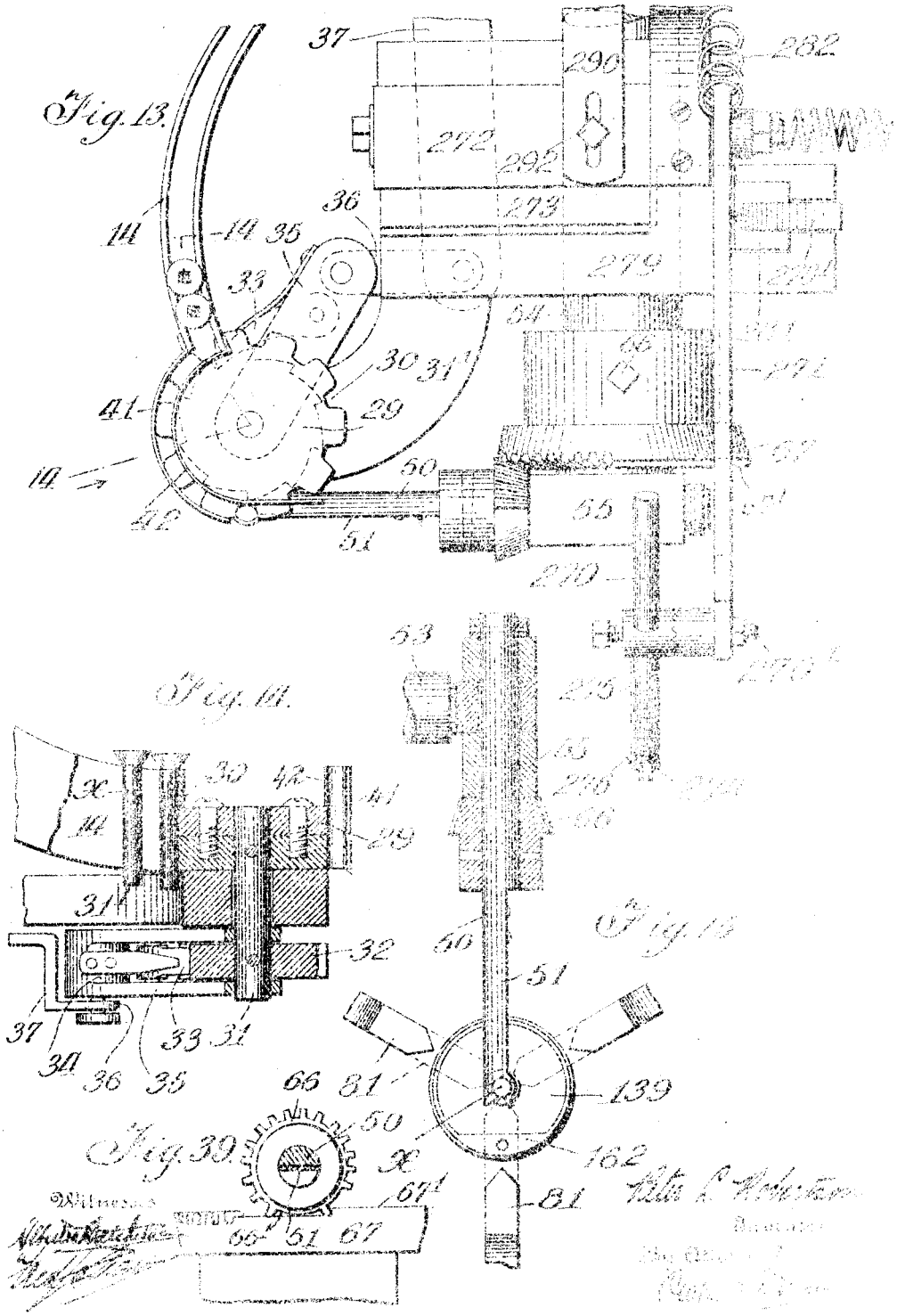

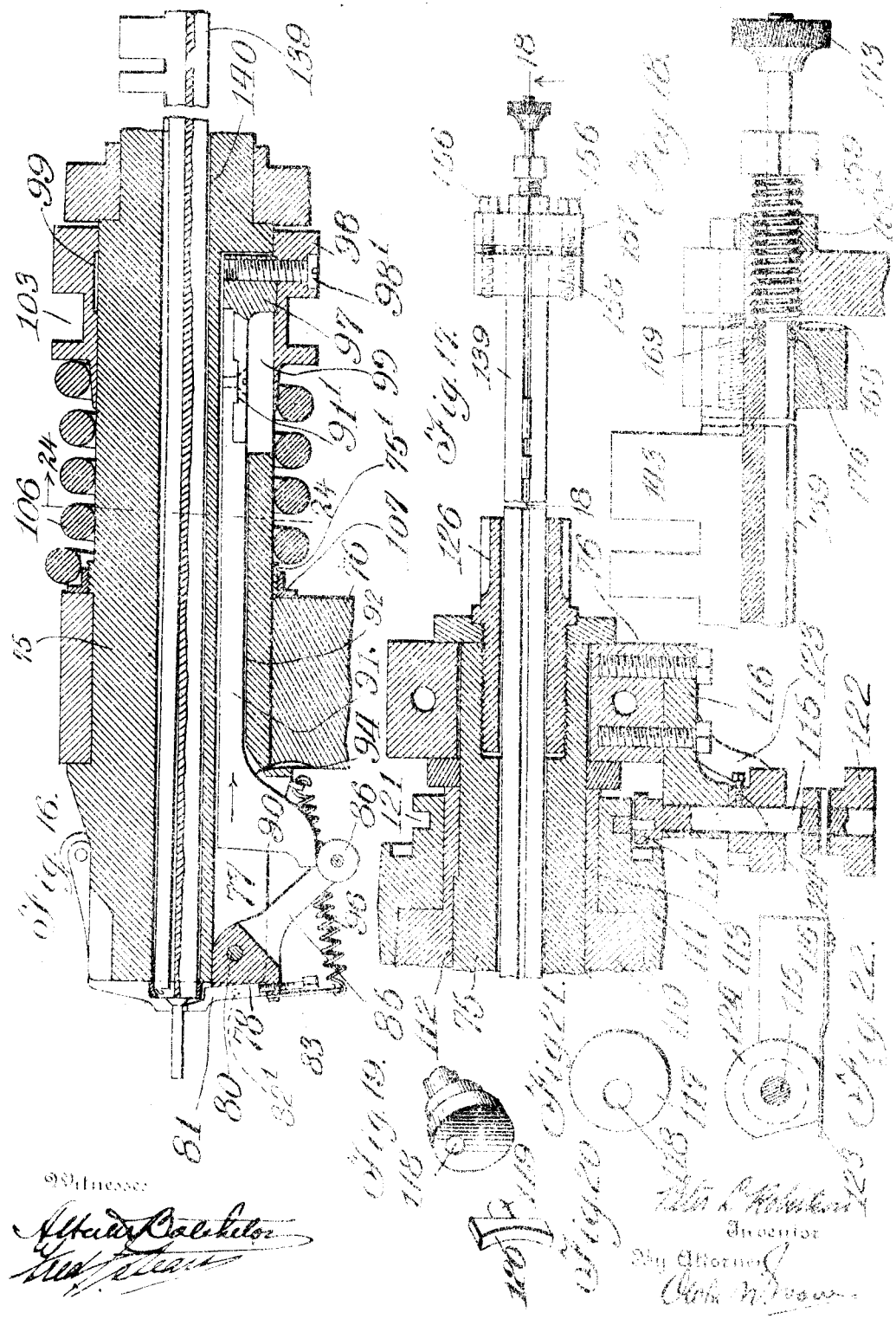

P. L. ROBERTSON.
SCREW MACHINE.
APPLICATION FILED DEC. 27, 1910.
1,051,915.
Patented Feb. 4, 1913.
12 SHEETS—SHEET 10.
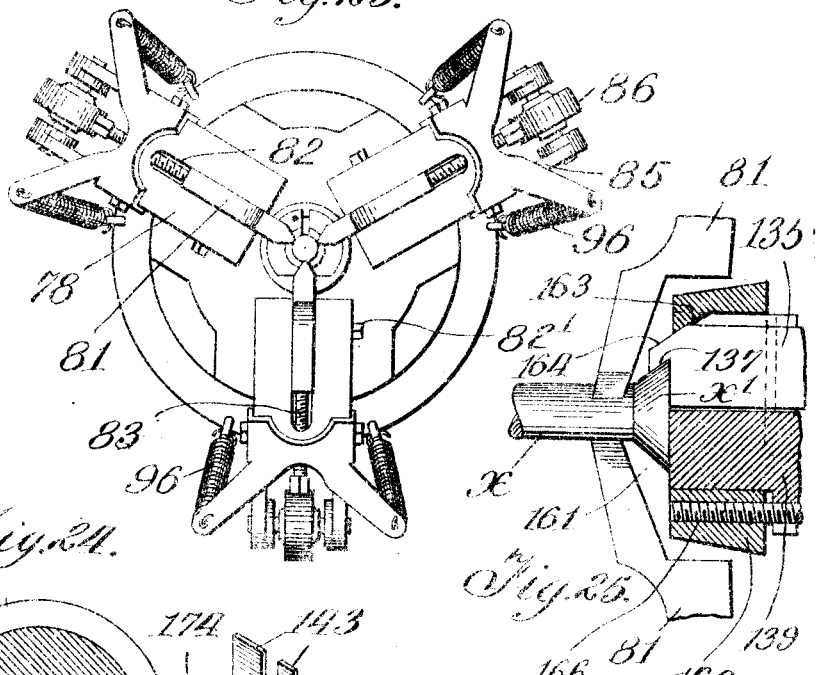

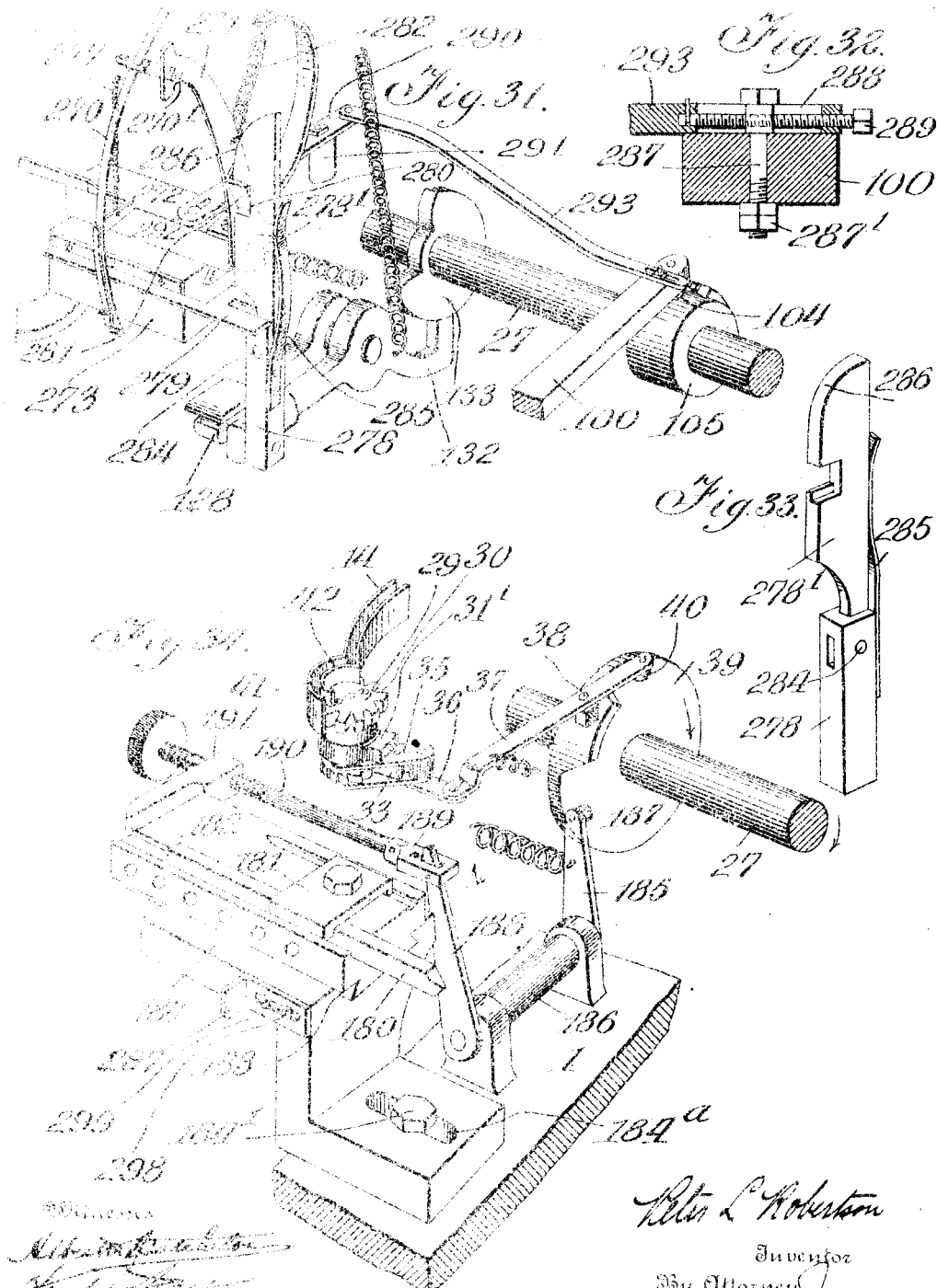

P. L. ROBERTSON.
SCREW MACHINE.
APPLICATION FILED DEC. 27, 1910.

1,051,915.

Patented Feb. 4, 1913.
12 SHEETS—SHEET 12.

Witnesses

Peter L. Robertson
Inventor
By Attorney

UNITED STATES PATENT OFFICE.

PETER LYMBURNER ROBERTSON, OF MILTON, NEAR HAMILTON, ONTARIO, CANADA.

SCREW-MACHINE.

1,051,915.   Specification of Letters Patent.   Patented Feb. 4, 1913.

Application filed December 27, 1910. Serial No. 599,548.

*To all whom it may concern:*

Be it known that I, PETER LYMBURNER ROBERTSON, of Milton, near Hamilton, Province of Ontario, Canada, have invented certain new and useful Improvements in Screw-Machines; and I do hereby declare that the following is a full, clear, and exact description of the same.

My invention relates to machines of the type adapted to act upon a screw blank after the latter has been formed to the required size, and particularly to a machine in which pointing and threading of the shank or body of the blank and shaving of the head thereof are carried out in one machine.

My invention has for an object to provide a machine in which the shank of a screw blank may be threaded and the head thereof shaved simultaneously.

Another object is to provide improved means for shaving the head of a screw or blank.

A further object is to provide improved means for feeding the blank to and discharging it from, the forming mechanism.

Another object is to provide improved means for adjusting the threading tool.

Still another object is to provide a machine for forming wood screws in which pointing and threading of the shank of the blank and shaving of the head thereof may be accomplished in the same machine.

Other objects and the advantages of the invention will be apparent to those skilled in the art from a consideration of the following description and accompanying drawings forming a part of this specification in which one embodiment of the invention has been described and illustrated and in which similar reference characters indicate the same parts throughout the various views and wherein—

Figure 35:
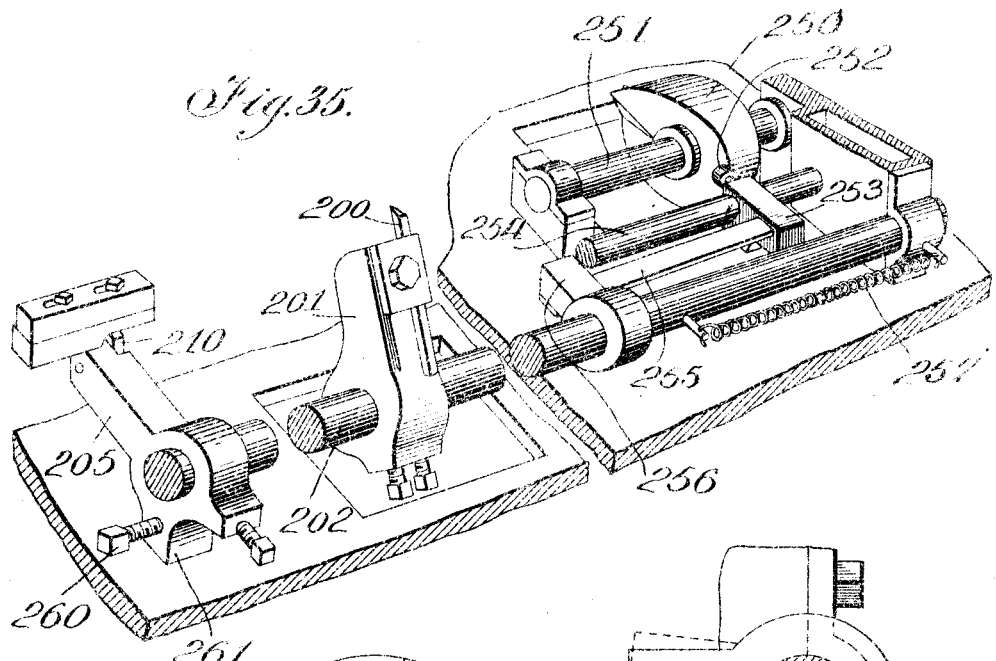
Figure 36:
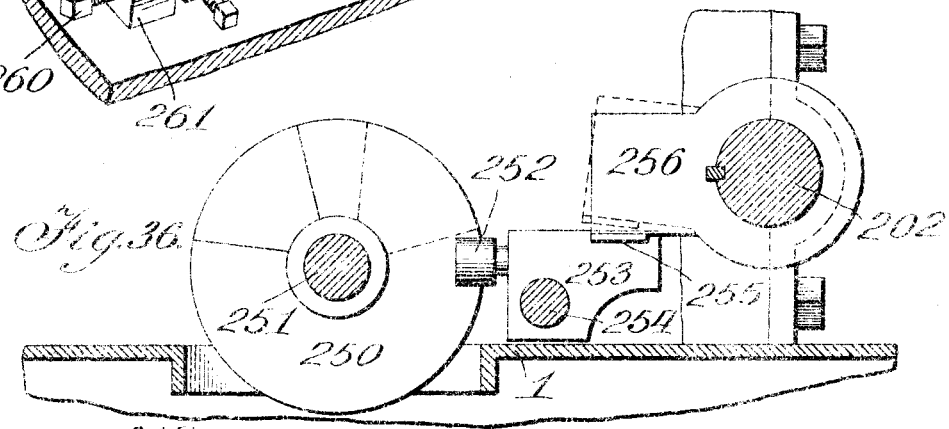
Figure 37:
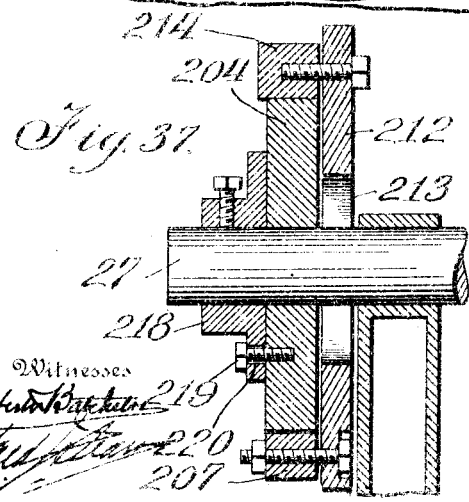
Figure 38:
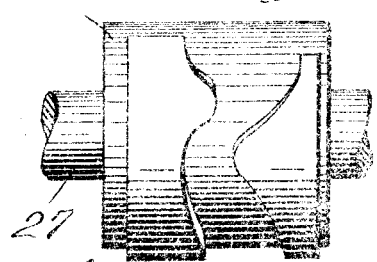

Figure 1 is a plan view of a screw machine constructed according to my invention; Fig. 2 is a side elevation thereof; Fig. 3 is an enlarged side elevation of a portion of the machine, the combined chute and splash guard being removed; Fig. 4 is a horizontal sectional view taken on line 4—4 Fig. 2, the train of gears operating the back-shaft being shown in elevation; Fig. 5 is an end elevation of the machine; Fig. 6 is a detail sectional view showing particularly the means for adjusting the threading tool throw; Fig. 7 is a transverse sectional view taken on line 7—7 Fig. 3; Fig. 8 is a detail face view of parts of the operating mechanism for the oscillatory feed arm; Fig. 9 is a detail perspective view of the arm operating the back rest; Fig. 10 is a detail side elevation of the hopper and the hoist operating means; Fig. 11 is a vertical sectional view taken on line 11—11 Fig. 10; Fig. 12 is a detail sectional view of a part of the hoist operating means; Fig. 13 is a detail plan view illustrating a portion of the blank feeding means and the pick out device; Fig. 14 is a vertical sectional view taken on line 14—14 Fig. 13; Fig. 15 is a detail view showing the mounting of the oscillatory feed arm; Fig. 16 is a longitudinal sectional view of the front portion of the chuck or gripping device and end mill; Fig. 17 is a similar view of the rear portion, but taken at right angles to Fig. 16; Fig. 18 is an enlarged detail section taken on line 18—18 Fig. 17; Figs. 19, 20, 21 and 22 are detail views of portions of the clutch operating means; Fig. 23 is a front view of the chuck; Fig. 24 is a transverse sectional view taken on line 24—24 Fig. 16; Fig. 25 is a detail sectional view of the front end of the end mill, showing also part of the blank and a portion of the gripping jaws; Fig. 26 is a perspective view of the shaving tool or end mill proper; Fig. 27 is a perspective view of the holder for the shaving tool; Fig. 28 is a perspective view of the collar for varying the inward or diagonal movement of the tool; Fig. 29 is a perspective view of the adjusting stem for the collar; Fig. 30 is a detail section showing the adjustable mounting of the end mill operating lever; Fig. 31 is a perspective view illustrating particularly the pick out device; Fig. 32 is a detail section showing the connection between the link leading to the pick out slide and the lever operating the clutch jaws; Fig. 33 is a perspective view of one of the operating parts of the pick out device; Fig. 34 is a perspective view showing the recessed disk comprising part of the blank feeding mechanism and its operating means; also the pointing tool and operating means therefor; Fig. 35 is a perspective view of the pointer tool and the means for reciprocating the latter; Fig. 36 is a detail transverse section showing part of the mechanism illustrated in Fig. 35; Fig. 37 is a detail section of the notch cam; and Fig. 38 is a detail elevation of the cam which operates the chuck jaws, and Fig. 39 is a detail inverted plan view of a portion of the oscillatory feed arm operating means.

The frame of the machine may be of any suitable construction, as here shown comprising a bed plate 1 supported on legs 2.

In the embodiment of the invention here illustrated the blanks which where shown in the drawings are indicated by the letter $x$, are fed to the forming mechanism from a suitable hopper 3 (see particularly Figs. 10, 11 and 12) preferably secured on the upper end of a standard 4 adjustably mounted on guides 5 on the bed plate 1 to which latter it is secured by suitable means as the bolts 6 passing through slots 7 in the base 4' of the standard and through the bed plate and having nuts 8 threaded on their ends. From the hopper the blanks are fed to an inclined chute 14 connected thereto at its upper end, this chute being formed by a pair of vertically arranged parallel strips on the tops of which the head of the blank rests, the body hanging down therebetween.

The blanks may be delivered to the chute by a suitable device as the slotted hoist 15. In order to obviate any chance of damage to the machine through the hoist sticking (as might be caused by the blanks in the hopper obstructing the movement thereof) I prefer to operate this hoist by mechanism providing a yielding or displaceable connection between the hoist and the initial operating gear. As here shown the hoist is vertically reciprocated by means of a connecting rod 16 pivoted thereto at its upper end and receiving motion from a crank disk 17 to which its lower end is connected. This disk 17 is rigidly mounted on a stub shaft 18 supported in bearings 19 on the base 4' of the standard 4. A second disk 17ª is also mounted rigidly on the stub shaft 18 and is adapted to be operatively engaged and rotated by a sprocket wheel 20 loose upon the shaft 18 by means of a bolt 21 the beveled end 22 of which projects slightly into a boring 23 in the sprocket wheel, a spring 24 normally holding the bolt in such position, a collar 21' on the bolt limiting the inward movement. It will be readily seen that in the event of the hoist 15 sticking the spring will yield and allow the beveled end of the bolt to disengage from the boring. The sprocket wheel 20 is driven by means of a sprocket chain 25 looped thereover and over a second sprocket wheel 26 on a countershaft 27, which I term the back shaft, and which is operated in a manner to be pointed out later.

The blanks travel down the chute 14 by gravity and upon reaching the lower end thereof are taken therefrom by the feeding mechanism and fed to mechanism adapted to act upon the blanks and which I term the forming mechanism. The improved feeding mechanism which I employ is composed of two main parts or members one of which takes the blank from the chute and delivers it to the other which in turn delivers it to the forming mechanism. The first of these parts consists briefly speaking of a rotatably mounted member adapted to receive the blank, and operated by suitable means to cause it to advance the blank to the desired point. In the present embodiment of my invention this part of the feeding mechanism is formed as follows: A horizontal disk 29 (see Figs. 13, 14 and 34) is located adjacent to the lower end of the chute and has its periphery formed with notches or recesses 30 to receive the blanks which are delivered thereto in vertical position. This disk is rigidly secured on the upper end of a vertical spindle 31 rotatable in a bearing bracket 31' on the upper face of which the disk rests freely, the bracket being secured upon a part of the standard 4. The disk 29 is intermittently rotated by means of a ratchet wheel 32 rigid on the lower end of the spindle 31 and which is operated by a pawl 33 pivoted to a link 34 having legs 35 which inclose the ratchet wheel and are pivoted thereto at one end. The opposite end of the link 34 is connected to a second link 36 which receives motion from a lever 37 to one end of which it is connected, such lever being fulcrumed between its ends as at 38 to a suitable part of the standard 4 and being operated by a cam 39 engaging a roller 40 in the opposite end thereof.

The blanks are retained in the notches 30, while they are being advanced by the rotation of the disk, by means of a substantially semi-circular retaining member in the form of a resilient strap 41 which partially surrounds the notched periphery of the disk 29 and which acts in conjunction with a second member or strap 42 inwardly of and parallel to the strap 41, these straps being secured at one end to and forming a continuation of the chute 14.

The second part or member of the feeding mechanism consists briefly speaking of an oscillatory arm adapted to take the blank from the first member and operated by suitable means to cause it to deliver the blank to the forming mechanism. In this embodiment of my invention this second part of the feeding mechanism comprises (see particularly Figs. 7, 8, 13 and 15) an oscillatory arm 50 which oscillates from a substantially horizontal position, shown in Figs. 2 and 13, in which it receives the blank from the disk 29, to a substantially vertical position, shown in Figs. 3 and 15, in which latter position the blank is in position to be engaged by the gripping device or chuck of the forming mechanism to which further reference will be presently made. The arm 50 is provided on its outer or free end with a spring bill 51 which, when the arm is in the position shown in Fig. 13, is underneath the recessed portion of the disk 29 and into which the rotation of the disk forces the blank, the arm being oscillated by a short horizontal rocker shaft 53 freely supported in a sleeve 54 formed integrally with the standard 4, the shaft having rigidly secured to one end thereof a block 55 in which the inner end of the arm 50 is revolubly mounted. This shaft is operated by a crank pin 57 projecting from a disk 58 on the end of the shaft and carrying a roller 58' engaging a slot 59 in a disk 60. This disk has a vertical boring in which is rigidly secured a rod 61 the ends whereof project through the walls of a cylindrical housing 62 which incloses the disks 58 and 60 and is secured by a set screw 63 on the reduced end 64 of the sleeve 54. The rod 61 is reciprocated to oscillate the disk 58 (through the medium of disk 60 and pin 57) respectively by a single throw cam 64 on countershaft 27 and a retractile helical spring 61' secured at one end to the top of the rod and at its other end to the lower part of the housing 62, the spring moving the arm 50 toward the gripper and the cam returning it.

In order to cause the blank to be delivered to the gripping device with its head in advance of the arm 50 so as to be readily engaged by the gripper the arm is also rotated on its own axis substantially a half turn in opposite directions as it swings from one position to the other. This I accomplish by means of a small bevel gear or pinion 66 rigid on arm 50 and engaging a larger segmental bevel gear 67 secured by a set screw 68 on the reduced end 69 (opposite to end 64) of the sleeve 54.

As will be seen by referring particularly to Fig. 3 the pinion 66 disengages from the segmental gear 67 before the arm 50 has reached the limit of its downward swing while the gear and pinion are relatively so arranged as to cause the arm to have made the required half turn when the gears disengage. The purpose of this construction is to obviate any chance of the head of the blank striking one of the jaws of the gripping device which will now be described, a cut away portion 66' on the pinion sliding on a cut away portion of the gear 66, the arm being limited in its movement by a rib 67' on the gear.

The improved gripping device or chuck which I employ to hold and revolve the blank while being acted upon by the forming means consists essentially of a spindle having a plurality of jaws pivoted thereto, these jaws being operated by sliding cams carried by the spindle and preferably located in longitudinal grooves therein. As here shown (see particularly Figs. 1, 2, 16, 17, 23 and 24) a cylindrical chuck spindle 75 is rotatably supported in suitable bearing brackets 76 formed on the bed plate 1 and provided with three equally spaced and radially disposed slots 77 in which the gripping members or jaws 78 are located, these jaws being pivoted on pins 80 supported in the spindle 75. Each of the jaws 78 is provided with an adjustable die 81 secured in a radial slot 82 by a set screw 82', a second screw 83 providing an abutment for the rear end of the tooth, these dies being provided so that the gripping faces of the jaws may be easily "trued up". Formed integrally with the jaws are rearwardly extending arms 85, having mounted at their ends rollers 86 adapted to be engaged to open the jaws by means of cams 90 formed on the ends of reciprocating bars 91 slidable in passages or borings 92 in the spindle 75, these borings communicating with and forming rearward extensions of the slots 77 into which the ends of the bars 91 which carry the cams project, springs 96 connecting the jaws to the spindle.

When the bars are reciprocated in the direction indicated by the arrow in Fig. 16 the jaws will close, and when reciprocated in the opposite direction the springs 96 will open the jaws. I prefer to form the cams, as shown, with the part 94 thereof, which engages the roller 86 when the jaws are just commencing to close with a pronounced rise to give a relatively rapid movement to the jaws while the part 95 of the cams which engages the rollers when the jaws are nearing closed position has a relatively small rise to cause the jaws to be held firmly closed upon the blank.

The bars 91 are operated from a sleeve 98 slidable on the spindle 75 and having the thickened ends 97 of the bars fastened thereto by set screws 98' or otherwise, slots 99 in the spindle accommodating the ends 97 while the bars are formed in two parts joined together as at 91' to permit of their insertion in place.

The sleeve 98 is operated to open the jaws by an oscillatory lever 100 fulcrumed as at 101 to the machine frame and carrying on one end a roller 102 engaging in an annular groove 103 in the sleeve, the opposite end of the lever carrying a roller 104 engaging a double face cam 105 on the back-shaft 27. A spring 106 encircling the spindle 75 and bearing between a collar 107 threaded on a flange 75' thereon and the sleeve 98 acts to close the jaws when the cams release the latter.

In this embodiment of my invention the power by which the machine is driven is applied initially to the spindle 75. I will therefore now describe the preferred means through which the driving power is applied thereto.

In order to enable the machine to be quickly started and stopped, as is desirable when the parts are being adjusted to form different types or sizes of screws, I mount the starting and stopping device directly on the spindle 75 and provide improved means for operating the same. As here shown (see particularly Figs. 17, 19, 20, 21 and 22) I mount on the chuck spindle 75 a cone clutch comprising the usual tight and loose members 110 and 111 respectively, the former of which is keyed to the spindle as at 112 and has a sleeve extension 113 on which is freely mounted the loose member 111 which latter is adapted to be rotated by a belt 114 driven from any suitable source of power. The embodiment of my improved clutch operating means which I show here comprises a small spindle 115 journaled in any suitable part of the machine frame, as the bracket 116 bolted to one of the bearings 76. The inner end of this spindle is formed to present a disk 117 having an eccentric boring 118 in which engages a stud 119 formed on a segmental shifter block 120 which bears in a groove 121 in the loose member 111 the outer end of the spindle being provided with a suitable knob or handle 122, adapted to be grasped by the operator. It will be readily seen that the partial rotation of the disk in opposite directions will act, through the medium of the disk 117 and shifter block 120, to throw the loose member 111 into or out of engagement with the tight member 110, the spindle being yieldingly held in either position by a flat spring 123 which bears against either one (according to the position of the member 111) of a pair of flattened faces on a disk 124 rigidly secured by suitable means as the set screw 124′ on the spindle 115.

Any suitable means as the train of gears 125 driven from a pinion 126 rigid on one end of the chuck spindle 75 may be employed to operate the back-shaft 27.

While the blank is being acted upon by the forming mechanism the body thereof is supported by a suitable "back-rest" (see particularly Fig. 7) as here shown which comprises an arm 127 pivoted at its lower end to the base of the standard 4 and having a cylindrical die 127′ provided with a semicircular groove adapted to partially inclose the body of the blank. The back rest is moved into engagement with the blank by an arm 128 which engages the back rest through a finger 128′ adjustably secured to the arm by means of a bolt 129 passing through a slot 129′ in the finger and screwed into the arm 128; a wedge 130 being employed to adjust the finger. The arm 128 is rigid on a stub shaft 131 which serves as a fulcrum for a "goose neck" lever 132 rigid thereon and receiving motion from a cam 133 on the back-shaft 27, a spring 134 normally retaining the lever away from the back-rest.

I will now describe the preferred embodiment of my improved means for shaving the head of the blank after the latter has been delivered to the chuck or gripping device above described and by means of which I am enabled to shave the head of the blank while the latter is being acted upon by the threading mechanism, this means consisting briefly speaking of a shaving tool or end mill located within the spindle and movable longitudinally thereof, means being provided for moving the tool into engagement with the blank, the tool being supported in a tool holder extending through the spindle concentrically thereof and retained by suitable means against rotation.

Referring now particularly to Figs. 17, 18, and 24 to 29 inclusive, the shaving tool comprises a flat bar 135 and in this embodiment of my invention in which the machine is shown as forming "flat head" screws, I provide the front or working end of the tool with a transverse cutting edge 136 adapted to shave the face of the head and a diagonal cutting edge 137 adapted to shave the inside section of the head commonly known as the "countersunk" portion of the head. This bar 135 is slidable in a groove 138 in a tool holder comprising a rod 139 located in an axial bearing 140 extending through the chuck spindle 75 and the pinion 126. One end of this rod, which I term the front end, is located adjacent to the front end of the said spindle, the opposite end extending to a point some distance beyond the rear end of the latter. The shaving tool is moved into engagement with the blank by suitable means as the lever 141 fulcrumed adjustably between its ends on a bracket 142 carried by one of the bearings 76. One end of the lever engages between lugs 143 extending upwardly from the bar 135 while the opposite end of the lever receives motion from a cam 144 on the back shaft 27; a flat spring 144′ secured on the bracket 142 normally retaining the shaving tool away from the head of the blank. The adjustment of the fulcrum point of the lever may be effected by pivoting the lever on the upper end of a pin 145 passing through a slot 146 in the bracket 142 and having threaded horizontally therethrough a bolt 147 extending longitudinally through the slot 146 and swiveled in the bracket 142. The bolt 147 has at one end a knob or handle 148 by which it is turned and at its opposite end a pair of jam nuts 149 by means of which and the handle 148 it is held against longitudinal movement. The pin 145 has its lower end projecting below the bracket 142, a buttertly nut 150 being screwed on this end and acting in conjunction with an annular flange 151 on the pin 145 to clamp the pin to the blank.

To permit of the rod 139 being adjusted longitudinally of the spindle to accommodate different sizes of screws, and also to hold the rod against rotation suitable means for that purpose may be provided. The means I prefer to use comprises a pair of screws 156 passing freely through borings in a bracket 157 carried by the machine frame and threaded into tapped borings in a collar 158 rigid on the end of the rod; while a bolt 149 threaded through the bracket 157 bears against a perforated plate 168, to be presently further alluded to, on the end of the rod, this bolt being locked by a jam nut 159.

In order to cause the cutting face 137 of the shaving tool to act upon the inside or countersunk portion (indicated at $x'$ Fig. 25) of the head when the tool is brought into engagement with the latter, I have provided means whereby the working end of the tool is moved diagonally into engagement with the head of the blank, this means preferably comprising a collar 160 encircling the front end of the rod 139 which projects slightly beyond the front of the chuck spindle, the rod being cut away as at 161 to accommodate a segmental web 162 on the collar. The latter has an inwardly projecting lug 163 having a beveled face which forms a cam adapted to engage a beveled face 164 on the shaving tool as the latter advances, the angle of the bevels on the lug and tool preferably corresponding to the angle of the countersunk part $x'$, this construction being provided in order that the top edge of the screw may be properly milled to remove any bur or unevenness, the diagonal portion of the cutting tool being preferably adapted to act only upon the upper portion of the countersink. In order to insure the point of the diagonal face on the tool clearing the head of the screw when the tool is moved forward, the bar 135 is curved slightly in the plane thereof as shown in Fig. 16 so that when the bar is inserted in the spindle the front end thereof will be normally pressed upward against the inner face of the collar while the rear portion thereof presses against the face of the boring 140, the resiliency of the metal of the bar allowing the front end to move inward or diagonally when brought into engagement with the lug 163. The collar 160 may be adjusted along the rod 139 to vary the amount of inward movement given the shaving tool by suitable means as the rotatable stem 166 threaded at one end into a tapped boring in the web 162 of the collar and extending rearwardly through a groove 167 in the underside of the rod 139 and being held against longitudinal movement by the perforated plate 168 covering a recess 169 in the end of the rod in which recess is located a collar 170 rigid on the stem; the latter extending through an axial boring in the bolt 159, the end of the stem being provided with a suitable knob or head 173 for turning it.

A suitable lubricant may be supplied to the shaving tool by means of a tube 174 located in a groove 175 in the rod 139 and leading from any source of lubricant supply.

It will be seen that by means of my improved shaving device I am enabled to have the shaving tool act upon the head of the blank during a large part of the period in which the latter is held in the jaws 78 and I am thus enabled to produce a screw having a smoother and more finished head than has heretofore been possible without unduly increasing the time required to produce the screw.

After the blank has been gripped by the jaws, prior to being engaged by the shaving and threading means, it is acted upon by the pointing mechanism (see particularly Figs. 3 and 34) which points the end thereof. This pointing mechanism as here shown comprises a pointing tool 180 suitably secured, as by the clamp 181, on a slide 182 mounted in a dovetail guide 183 on a bracket 184 adjustably secured as by the bolt 184' passing through a slot 184'' in the base of the bracket to the bed plate 1. The tool is moved into engagement with the blank by suitable means as the arm 185 rigid on one end of a short rocker shaft 186 and having a roller 187 engaging the cam 39 through which the notched disk is operated. The opposite end of the rocker shaft has rigid thereon another arm 188 to the end of which is connected a forked block 189 swiveled in any suitable manner on the end of a bolt 190 threaded through an extension 191 of the slide 182.

After the blank has been pointed it is then threaded and the head thereof shaved by the means above described. I prefer to have the shaving tool remain out of engagement with the blank until after the latter has been pointed in order that the pointing tool may have the full amount of the driving power of the machine applied thereto. The threading mechanism I prefer to use (see particularly Figs. 1, 2, 5, 6, 7, 35 and 36) comprises a tool 200 clamped to an arm 201 on a shaft 202 supported in suitable bearings 203 on the machine frame, the shaft 202 being rocked to move the tool into engagement with the blank by suitable means as the arm 205 secured on the shaft by a set screw 206 or otherwise and receiving motion from a rocking lever 207 fulcrumed in a bracket on the machine frame and operated by a "notch cam" 204 as will be presently set forth. This lever 207 carries on the end which operates the arm 205, a "forming cam" 208 which engages the top of a feeler or finger 210 pivoted as at 211 on the end of the arm 205. The cam 208 acts to give the required contour to the shank of the screw at the bottom of the threads, as the tool is moved along the blank as will be presently set forth.

The opposite end of the lever to that carrying the block 208 has pivotally connected thereto a link 212 which straddles the back-shaft 27, being formed with a slot 213 to accommodate the latter. This link carries on its upper end a block 214 which engages the notch cam 204 which latter is in the main of well known construction, with the series of alternate cam members 204' and notches 215, and having a part cut away as at 215'. A spring 216 connected at one end to the arm 217 rigid on the shaft 202 and at its other end to the machine frame acts to hold the tool out of engagement with the blank. In order to enable the notch cam to be adjusted when desired to properly time its action with relation to the other parts of the machine, I prefer to mount the cam adjustably on a disk 218 rigid on the back shaft 27, the cam being secured to such disk by suitable means as the bolts 219 passing through slots 220 in the disk and screwed into the cam.

In order to cause the block 214 to follow the contour presented by the periphery of the notch cam so that the tool may be moved into and out of engagement with the blank at the proper time and in order that the lever 207 may be adjusted to vary the throw of the arm 205 I prefer to mount such lever as follows:—The bracket 230 on which the lever is fulcrumed has a pair of arms 231 each having a slot 232 into which the opposite ends of the fulcrum pin 233 of the lever project. A coiled spring 235 located in a boring 236 in a post 237 on the bed plate 1 yieldingly holds a bolt 238 in engagement with the underside of the lever and the latter in engagement with a wedge 239 located between the lever and a block 240 pivoted by means of a pin 241 in the upper ends of the arms 231. Adjustment of the wedge is effected by means of a threaded pin 242 fastened at one end to the block 240 and having screwed thereon a nut 243 having a groove 244 in which the upturned bifurcated end of the wedge is held. The spring 235 as will be readily seen acts both to hold the lever 207 in engagement with the wedge and to cause the block 214 to remain in yielding contact with the periphery of the notch cam.

The shaft 202 is reciprocated in a forward direction to move the tool longitudinally of the blank by any suitable means as the cam 250 mounted on the lengthened arbor 251 of one of the gears 125 before mentioned, a roller 252 carried by a block 253 rigid on a sliding shaft or traveler 254 engaging the cam. A spring 254' located in a boring 254ᵃ in the traveler and bearing between a bolt 254ᵇ, whose opposite end engages one of the bearings 76, and the inner end of the boring keeps the roller 252 in engagement with the cam. The block 253 in turn engages the end of a flat resilient strap 255 secured at its opposite end to an arm 256 on the shaft 202, a coiled spring 257 being used to move the shaft in the opposite direction. A bolt 260 threaded through a lug 261 on the arm 205 is adapted to bear against one of the bearings 203 to limit this movement. The cam 250 is formed in a well known manner to give the proper motion to the tool to cut the thread on the blank.

After the threading operation has been performed the screw is taken from the jaws by a suitable "pick out" device (see particularly Figs. 3, 7, 31 and 33) which as here shown, comprises a curved rod 270 on the end of an arm 271 pivoted at its opposite end on a slide 272 mounted in a dovetail guide formed in an extension 273 of the standard 4, the rod being secured to the arm by suitable means as the pin 270' having a boring in which the rod is rigidly fixed, this pin in turn being secured to the arm by the nut 270ᵃ screwed over the reduced end of the pin and bearing against the arm. This rod 270 has on its lower end a spring bill or clip 274 carried by a short lever 275 pivoted as at 276 to the rod 270, a retractile helical spring 277 normally keeping the bill pressed against the rod. The arm 271 is swung downwardly to cause the bill to seize the finished screw (see Fig. 7) by means of the before mentioned goose neck lever 182 to the end of which is connected the lower end of a vertical bar formed in two parts 278, 278', and guided between the forked ends of a strap 279 secured to the part 273 before mentioned. The upper part 278' of the bar is in the form of a latch pivoted as at 284 to the lower part, being yieldingly held against relative displacement by a spring 285 and having a beveled upper end 286. This latch is notched as at 280 to engage a flat cam 281 secured to the arm 271, a spring 282 normally retaining the pick out device in its raised position. I prefer to arrange these parts as above stated in order that when blanks of considerable length are being acted upon the finished screw after being moved longitudinally as will presently be pointed out may be thrown quickly upward, to avoid any chance of the following blank striking the same, by the spring 282.

After the bill 274 has seized the blank it is moved in a direction longitudinally of the latter and away from the chuck to allow the head of the screw to clear the jaws 78 by means preferably comprising a lever 290 fulcrumed between its ends as at 291 to the standard 4 and connected at one end as at 292 to the slide 272 its opposite end being connected by a link 293 to the lever 100 which operates the jaws 78.

The connection between the link 293 and lever 100 is made adjustable so that when it is desired for reasons above pointed out to have the blank moved quickly upward the link may be adjusted to cause the slide to move a sufficient distance to disengage the cam 281 from the notch 280, the arm thus swinging up in advance of the bar, the spring latch on the bar reëngaging the cam when the bar is moved up by the goose neck as will be readily understood.

As here shown the connection is effected (see Fig. 32) by a pin 287 rotatably secured by nuts 287' on the lever 100 and passing through a slot 288 in the link, a bolt 289 being threaded through a tapped boring in the pin and swiveled in the link while the screws are released from the bill 274 by a trip in the form of a bell crank lever pivoted to an arm 295 extending upwardly from the pointer slide 182 before mentioned, the arm being secured to the slide by bolts 295' passing therethrough and threaded into tapped holes 295ᵃ in the slide there being a plurality of these holes to permit of adjustment of the arm; one of the arms 296 of the lever projecting over the lever 275 before mentioned, the other 296' being adapted to engage (when the pointing tool is advanced) a stop 297 adjustably secured, as by the screws 298 passing through a slot 299 therein, to the bracket 184. To receive the screws when released from the bill 274 and direct them into any suitable receptacle (not shown) I have provided a chute 305 supported on the machine by means of a dovetail lug 306 fitting into a corresponding dovetail groove in one of the bearings 76 the chute preferably having one of its walls extended to form also a splash guard for the lubricant supplied to the shaving tool.

By mounting, as will be seen from the drawings and foregoing description, the feeding means, back rest and pick out device upon the adjustable standard 4, I provide a common adjusting means for these parts whereby they may be adjusted simultaneously when the machine is being set up for different sizes of screws.

Operation: The blanks are first placed in the hopper 3 and are fed by the hoist 15 to the chute 14 down which they travel by gravity. As each blank reaches the bottom of the chute it enters one of the notches 30 in the disk 29, and is carried around as the disk is rotated (through ratchet wheel 32, pawl 33, etc.) until it is forced into the spring bill 51 on the arm 50. The latter is then operated (through shaft 53, gears 66 and 67, etc.) to deliver the blank to the chuck 75, the jaws closing and gripping the blank as it reaches the position shown in Fig. 3 and pressing it against the rod 139. While the jaws are closing the back rest commences moving toward the blank, (through arm 128, goose neck lever 132, etc.,) the back rest reaching the position in which it supports the blank after the arm 50 has started its return movement toward the disk 29. The pointing tool then advances into engagement with the blank, the pointing tool being operated by the cam 39 acting through the arms 185 and 188. After the blank is pointed, and simultaneously with the action of the shaving tool it is threaded, the threading tool 200 being moved transversely into engagement with the blank by means of the arm 205, lever 207, link 212, notch cam 204, etc., while it is moved longitudinally of the blank to form the thread by means of the cam 250, block 253, strap 255, arm 256 and shaft 202, the arrangement and relative rotation of the cam 250 and the notch cam 204 whereby the tool is moved along the blank a sufficient number of times to cut the required depth of thread being well known. During the threading operation the shaving tool remains in engagement with the head of the blank. After the threading is completed the shaving tool 135 and threading tool 202 move away from the screw, the block 214 engaging the cut away portion of the notch cam to allow the threading tool to swing outward a sufficient distance to permit the finished screw to be withdrawn and a new blank inserted. With the parts in this position the strap 255 is disengaged from the block 253 (see Fig. 36) and the reciprocating motion of the tool ceases, the bolt 260 resting against the bearing 203 and retaining the shaft 202 in position to cause the strap to reëngage the block when the tool is again swung inward by the notch cam 204. The pick out bill operated by means of cam 133, goose neck lever 132, etc., comes down and seizes the screw, the jaws opening and allowing the screw to be moved by means of the slide 272 in a longitudinal direction away from the jaws 78 and then upwardly, the operation of the jaws and the slide from the same lever 141 causing the slide to move simultaneously with the opening of the jaws. As the pick out bill is moving upwardly the following blank is being fed to chuck by the arm 50 and when the pointing tool moves into engagement with this blank, the arm 296' of the bell crank lever engages the stop 297 and causes the arm 296 to engage the lever 275 and release the finished screw from the pick out bill, the screw falling into the inclined chute 305, and dropping from the latter into any suitable receptacle.

It will be seen that with the means for operating the jaws of the chuck arranged as shown the center of the chuck spindle is left free for the insertion of the shaving tool while the reciprocating bars, being within the periphery of the spindle do not in any way contact with or interfere with the bearings for the latter.

I do not claim the chuck for holding the blanks while being acted upon, the clutch for applying the power thereto, or the means for feeding the blanks to the forming mechanism as they form the subject matter of divisional applications filed by me on June 2, 1911, under Serial Nos. 630,889, 630,891, and 630,890 respectively.

What I claim is as follows:—

1. A screw machine having a blank gripping chuck formed with an axial boring, a shaving tool within such boring, means for reciprocating such tool, and a guiding device located within the chuck for such shaving tool independent of such means adapted to cause the latter to move into engagement with the head of the blank in a plane having the axis of the blank lying therein.

2. A screw machine having a blank gripping chuck formed with an axial boring, a shaving tool within such boring, means for reciprocating such tool, and a guiding device located within the chuck for such shaving tool independent of such means adapted to cause the latter to move into engagement with the head of the blank in a plane having the axis of the blank lying therein and in a direction diagonal to such axis.

3. In a screw machine, in combination, a gripping chuck formed with an axial opening, a shaving tool within the opening, means for moving such tool longitudinally of the chuck, and means adapted to be caused to operate by the longitudinal movement of the tool for imparting a diagonal movement to the cutting face of the tool.

4. In a screw machine, in combination, a gripping chuck formed with an axial opening, a shaving tool within the opening, means for moving such tool longitudinally of the chuck, and means acting in conjunction with the last mentioned means for imparting a diagonal movement to the working end of the tool in a plane parallel to the axis of the chuck, including a cam member located adjacent to the working end of the tool and adapted to engage the tool upon movement of the latter.

5. In a screw machine, in combination, a gripping chuck formed with an axial opening, a rod extending through the said opening and having its periphery longitudinally slotted, a shaving tool supported by the rod within the said slot, and operating mechanism for such shaving tool.

6. In a screw machine, in combination, a gripping chuck formed with an axial opening, a rod extending through the said opening, such rod having a longitudinal groove, a shaving tool slidable in the said groove, a collar encircling the rod, such collar being formed with an inwardly projecting cam lug adapted at times to engage the said shaving tool, and operating mechanism for the shaving tool.

7. In a screw machine, in combination, a gripping chuck formed with an axial opening, a rod extending through the opening, such rod having a longitudinal groove, a shaving tool slidable in the said groove, a collar slidable upon the rod, such collar being formed with an inwardly projecting cam lug adapted to engage the said shaving tool, and means for adjusting such collar longitudinally of the rod.

8. In a screw machine, in combination, a gripping chuck formed with an axial opening, a rod extending through the opening, such rod having a longitudinal groove, a shaving tool slidable in the said groove, a collar slidable upon the rod, such collar being formed with an inwardly projecting cam lug adapted to engage the said shaving tool, and means for adjusting such collar longitudinally of the rod, including a stem connected at one end to the collar, and provided with means whereby it may be operated.

9. In a screw machine, in combination, a gripping chuck formed with an axial opening, a rod extending through the opening, such rod being formed with a pair of longitudinal grooves, a shaving tool slidable in one of the said grooves, a collar slidable upon the rod such collar being formed with an inwardly projecting cam lug adapted to at times engage the said shaving tool, and means for adjusting the collar longitudinally including a rotatable stem located in the other of the said grooves and threaded into the collar, and means holding such stem against longitudinal movement.

10. In a screw machine, the combination with a chuck adapted to hold a screw blank, of a threading tool, a lever fulcrumed between its ends, and adapted to operate the said tool in a direction transverse of the blank, means for operating the lever, and means for adjusting the fulcrum point of the lever, for the purpose set forth.

11. In a screw machine, the combination with a chuck adapted to hold a screw blank, of a threading tool, a lever fulcrumed between its ends, and adapted to operate the said tool in a direction transverse of the blank, means for operating the lever, and means for adjusting the fulcrum point of the lever, including an adjustable wedge in bearing relation with the lever, for the purpose set forth.

12. In a screw machine, the combination with a chuck adapted to hold a screw blank, of a threading tool, a lever fulcrumed between its ends and adapted to operate the said tool in a direction transverse of the blank, means for operating the lever, a spring pressed bolt bearing against the lever near one end thereof, a bracket in which the lever is mounted, a block carried by the bracket, a wedge located between the said lever and block, and means for adjusting the said wedge.

13. In a screw machine, the combination with a chuck adapted to hold a screw blank, of a threading tool, a lever fulcrumed between its ends and adapted to operate the said tool in a direction transverse of the blank, means for operating the lever, a spring pressed bolt bearing against the lever near one end thereof, a bracket in which the lever is mounted, a block carried by the bracket, a wedge located between the said lever and block and formed with upturned lugs, and means for adjusting the said wedge including a threaded pin fastened at one end to the block, and a nut screwed upon such pin and engaging the said upturned lugs.

14. In a screw machine, the combination with a chuck provided with gripping jaws adapted to hold a screw blank, and operating mechanism applied to the said jaws, of a pick out device adapted to remove the screw from the jaws, and means operated by the said jaw operating means for moving the pick out device in a direction longitudinal of the chuck, for the purpose set forth.

15. In a screw machine, the combination with a chuck provided with gripping jaws adapted to hold a screw blank, and operating mechanism applied to the said jaws, of a pick out device, a slide on which such pick out device is mounted, and means operatively connecting the slide to the said jaw operating means, for the purpose set forth.

16. In a screw machine, in combination a chuck provided with gripping jaws adapted to hold a screw blank, a lever operatively connected to the said jaws, means for operating the said lever, a pick out device, a slide on which such pick out device is mounted, a second lever operatively connected to the slide, and means connecting the last mentioned lever to the jaw operating lever, for the purpose set forth.

17. In a screw machine, in combination a chuck provided with gripping jaws adapted to hold a screw blank, a lever operatively connected to the said jaws, means for operating the said lever, a pick out device, a slide on which such pick out device is mounted, a second lever operatively connected to the slide, means connecting the last mentioned lever to the jaw operating lever, and means for adjusting the connection between the said levers, for the purpose set forth.

18. In a screw machine, the combination with forming mechanism including a chuck, of means for removing the finished screw from the chuck, including an oscillatory arm, means carried by such arm for seizing the screw, a cam member mounted on the arm, a reciprocatory bar operatively engaging the said cam, and means for reciprocating the said bar.

19. In a screw machine, the combination with forming mechanism including a chuck, of means for removing the finished screw from the chuck, including an oscillatory arm, means carried by such arm for seizing the screw, means for moving the said arm longitudinally of the chuck, a cam member mounted on the arm, a reciprocatory bar operatively engaging the said cam, and means for reciprocating the said bar.

20. In a screw machine, the combination with forming mechanism including a chuck, of means for removing the finished screw from the chuck including an oscillatory arm, means carried by such arm for seizing the screw, means for moving the said arm longitudinally of the chuck, a cam member mounted on the arm, a reciprocating bar provided with a spring pressed latch adapted to engage the said cam, and means for reciprocating the said bar, for the purpose set forth.

21. In a screw machine, the combination with forming mechanism including a pointing device, of a pick out device adapted to remove the finished screw from the forming mechanism, and means for releasing the screw from the pick out device, such means being connected to and operated by the pointing device.

22. In a screw machine, the combination with forming mechanism including a pointing device, of a pick out device adapted to remove the finished screw from the forming mechanism, and means for releasing the screw from the pick out device, including a bell crank lever fulcrumed upon the pointing device, a fixed stop adapted to be engaged by one of the arms of the bell crank lever upon operation of the pointing device, and a member carried by the pick out device and adapted to be engaged by the other arm of the bell crank lever when the first mentioned arm engages the stop.

23. In a screw machine, the combination with forming mechanism including a pointing device, and a bracket upon which such pointing device is slidably mounted, of a pick out device provided with a screw holding clip and a lever adapted to yieldingly hold such clip in operative position, a stop adjustably secured upon the said bracket, and a bell crank lever fulcrumed upon the pointing device and having one of its arms adapted to engage the said stop and its other adapted to engage the first mentioned lever upon operation of the pointing device, for the purpose set forth.

24. In a screw machine, the combination with forming mechanism, of a back rest adapted to support the body of the screw while being acted upon by the forming mechanism, a pick out device for removing the screw from the forming mechanism, and means for operating such back rest and pick out device in unison, including a lever pivoted between its ends, means for operating the lever, and means operatively connecting the lever to the said back-rest and pick out device.

25. A screw machine having an adjustable standard, and blank feeding and removing means mounted on the standard, for the purpose set forth.

26. A screw machine having an adjustable standard having a back rest and blank feeding and removing means mounted thereon, for the purpose set forth.

27. In a screw machine, the combination with forming mechanism, of blank feeding and removing means, and means whereby such feeding and removing means may be adjusted in unison.

28. In a screw machine, the combination with forming mechanism, of means for feeding a blank to the forming mechanism, means for removing the said blank from the forming mechanism, a back rest adapted to support the blank while being acted upon by the forming mechanism, and means whereby such back rest and feeding and removing means may be adjusted in unison.

In testimony whereof, I have signed my name to this specification, in the presence of two subscribing witnesses.

PETER LYMBURNER ROBERTSON.

Witnesses:
ALEX CURRIE,
ALBERTO BATCHELOR.

Copies of this patent may be obtained for five cents each, by addressing the "Commissioner of Patents, Washington, D. C."